UNITED STATES PATENT OFFICE.

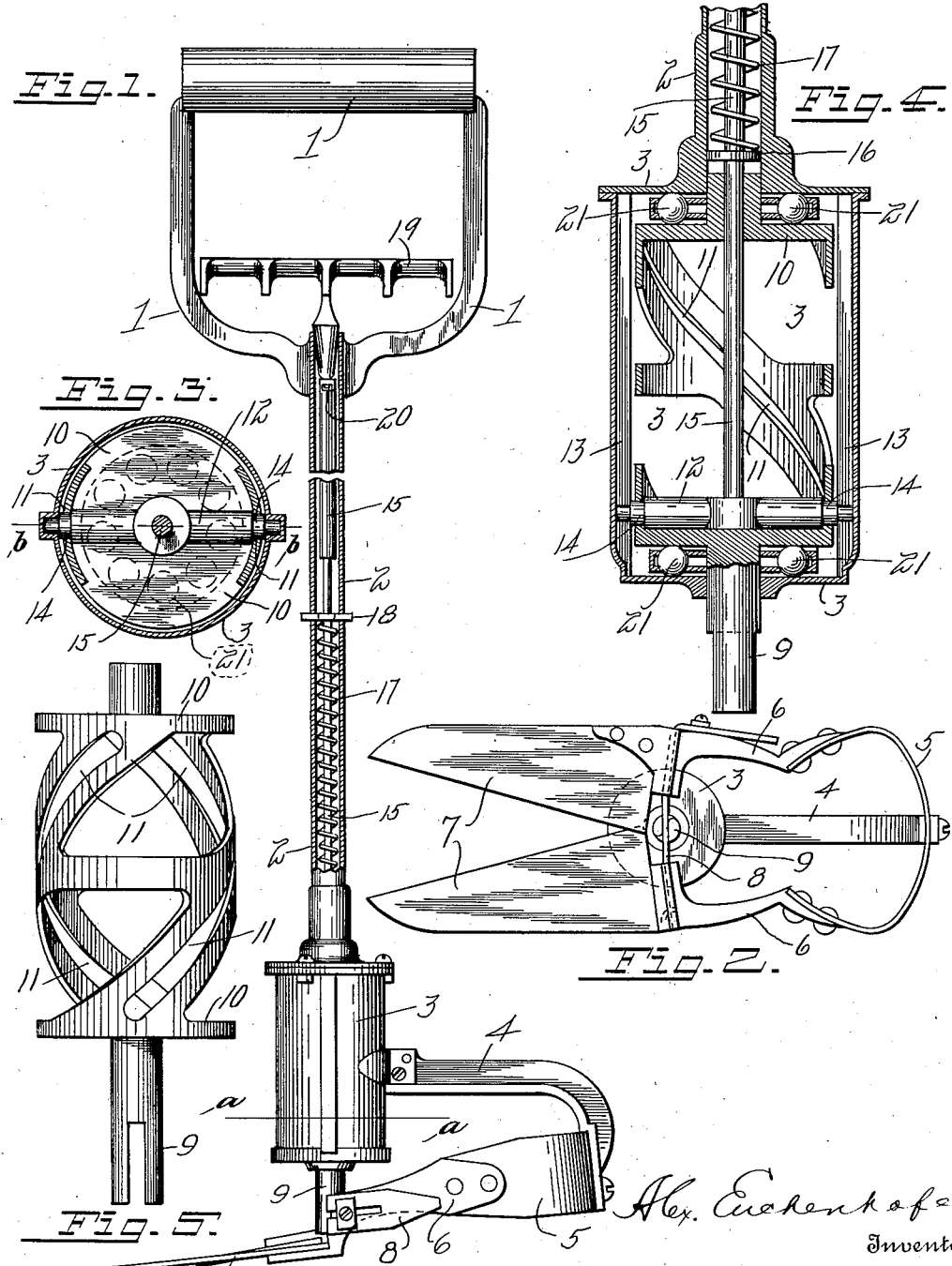

ALEXANDER EUCHENHOFER, OF DAYTON, OHIO.

GRASS-CUTTER.

977,288. Specification of Letters Patent. Patented Nov. 29, 1910.

Application filed December 1, 1909. Serial No. 530,776.

*To all whom it may concern:*

Be it known that I, ALEXANDER EUCHENHOFER, a citizen of the United States, residing at Dayton, in the county of Montgomery and State of Ohio, have invented certain new and useful Improvements in Grass-Cutters; and I do declare the following to be a full, clear, and exact description of the invention, such as will enable others skilled in the art to which it appertains to make and use the same, reference being had to the accompanying drawings, and to the letters and figures of reference marked thereon, which for a part of this specification.

This invention relates to new and useful improvements in grass cutters of the type distinct from wheel devices.

The objects of the invention are several; first, to provide a grass cutter which is adapted to enter fence corners and other places where the usual lawn mower cannot operate; secondly, to provide a grass trimmer or cutter which may be operated conveniently and entirely by one hand, leaving the other to manipulate a rake to present the blades of grass in a proper position for the cutter; and thirdly, to provide such a device with a minimum of friction as well as a minimum cost of construction, all as will hereinafter more fully be set forth in the following description in connection with the accompanying drawings, of which—

Figure 1 is a longitudinal elevation of my improved grass cutter with a portion broken out to save space, and a portion appearing in section. Fig. 2 is a bottom plan view of the shears or cutter looking from below, as the same is shown in Fig. 1. Fig. 3 is a cross sectional view of the body or casing portion on the line *a—a* of Fig. 1. Fig. 4 is an enlarged sectional view of the body or casing portion on the line *b—b* of Fig. 3. Fig. 5 is a detail side elevation of the slotted cam member removed from the body or casing shown in Figs. 1 and 4.

The handle or grip portion of the implement consists of parts 1 which form a yoke, and from which extends a hollow rod or tubular member 2. On the lower end of this rod 2 is mounted a body portion or cylindrical casing 3. The tubular rod 2 is of a sufficient length to permit of an easy manipulation of the implement and without requiring the manipulator to stoop or bend over. Extending from a side of the cylindrical casing 3, is an arm in the form of a bracket 4 which supports a well known form of shears or grass clippers. The said grass clippers consist of a spring 5 in the form of a bow, handle portions 6 and blades 7, the handle portions 6 affording means for attaching the ends of the spring 5.

The point of attachment between the bracket arm 4 and the spring 5 is at the middle of said spring, as is shown in Fig. 2. The handle portions 6 are connected at the rear of the blades 7 by a strip of flexible non-resilient material 8, such as leather, cloth, or a chain or any other material which has the necessary flexibility. The central portion of this flexible strip 8 passes between a bifurcated stud shaft 9, as shown in Fig. 2. The stud shaft 9 projects through the lower head of the cylindrical casing 3, and the upper end of said shaft connects with a cam member 10 which is provided with helical slots 11. The said cam member 10 turns in the cylindrical casing 3 upon anti-friction bearings such as balls 21, in order to prevent excessive friction between said cam member and the other parts. Vertically reciprocating within the cylindrical casing 3, is a cross head 12 the extreme outer ends of which project into the helical cam slots 11 and vertical slots 13 in the opposite sides of the casing 3. The said cross head 12 after so passing through the helical cam slots 11 and the slots 13, may be turned as will presently appear. The portions of said cross head lying within the cam slots are provided with anti-friction rollers 14 which engage the adjacent edges of said slots. The said cross head is vertically reciprocated throughout the lengths of the slots 13 in the sides of the casing 3, by a rod 15 which extends upwardly through the tube 2 and has its extreme upper end connected with a cross piece 19 lying within the handle yoke 1. This cross piece 19 provides a convenient finger grip for the hand which manipulates the implement. The lower end of the rod 15 is provided with an enlargement 16 which engages the lower end of a helical spring 17 which surrounds said rod 15. The upper end of the spring 17 engages a pin 18 which extends through the tube 2 and thus said spring is inclosed at both ends and is compressed when the rod 15 is drawn up by the fingers engaging the finger grip 19. The normal position of the spring 17 is open and when the spring is in such condition, the cutter blades 7 are open or spread apart as in Fig. 2. In the normal condition of the spring 17, it will be understood the cross head 12 is at the lower end of the cam member 10, as in Fig. 4. The finger grip 19 is connected to the rod 15 by a swivel 20. As appears in Fig. 4, the lower end of the rod 15 is rigidly attached to the cross head 12. When the rod 15 is elevated by means of the finger grip 19, the swivel 20 permits said finger grip to conform to the irregular movement of the finger and thus the possibility of undue friction is avoided. When the rod 15 and cross head 12 are elevated, the cam member 10 will be turned, and the effective length of the flexible connection 8 will be shortened by being wrapped around the stud shaft 9. This draws the cutter blades together, thereby securing a shearing action, and after the release of the finger grip 19 the spring 5 opens said cutter blades and so the implement is operated by drawing upwardly the rod 15 and releasing it. One hand may thus easily manipulate the device, leaving the other hand free to rake the grass into a proper position to be operated upon. The anti-friction members 21 above and below the cam member 10, reduce to a minimum the friction caused by the rocking of said cam member by the cross-head 12 through the rise and fall of the rod 15.

Having described my invention, I claim:

1. In a grass clipper, a pair of shears, a flexible non-resilient connecting member between the members of said shears, and means engaging said flexible non-resilient member to shorten the effective length thereof to close the shears.

2. In a grass clipper, a pair of shears the members of which are connected by a spring which maintains said shears normally open, a flexible connecting member between the opposite members of said shears, and rotative means engaging said flexible member and adapted to decrease the effective length of said flexible member and to thereby close the shears against the tension of the spring.

3. In a grass clipper, a pair of shears the members of which are connected by a spring, a handle to which said shears are connected, a flexible member extending between and attached to the members of said shears, a rotative member engaging said flexible member and adapted to decrease the length of said flexible member to close the members of the shears, a reciprocative member, and means interposed between said reciprocative member and said rotative member whereby the reciprocation of one member will rotate the other.

4. In a grass clipper, a pair of shears the members of which are connected by a spring which normally maintains said shears open, a flexible member between and attached to the members of said shears, a rotative member engaging said flexible member to shorten the same and thereby close the shears, cam devices controlling said rotative member, a reciprocating member operative in one direction to rotate the rotative member in one direction, and a spring operating the reciprocating member in the other direction to reverse the movement of the rotative member, substantially as and for the purposes specified.

In testimony whereof I affix my signature, in presence of two witnesses.

ALEXANDER EUCHENHOFER.

Witnesses:
  MATTHEW SIEBLER,
  HOWARD S. SMITH.